United States Patent
Kusch et al.

(10) Patent No.: US 8,994,327 B2
(45) Date of Patent: Mar. 31, 2015

(54) APPARATUS AND METHOD FOR CHARGING AN ELECTRIC VEHICLE

(75) Inventors: Ruediger Soeren Kusch, Clifton Park, NY (US); Robert Dean King, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 780 days.

(21) Appl. No.: 13/216,590

(22) Filed: Aug. 24, 2011

(65) Prior Publication Data

US 2013/0049684 A1 Feb. 28, 2013

(51) Int. Cl.
*H02J 7/00* (2006.01)
*B60L 11/18* (2006.01)

(52) U.S. Cl.
CPC ......... *B60L 11/1864* (2013.01); *B60L 11/1812* (2013.01); *B60L 11/1868* (2013.01); *Y02T 10/7088* (2013.01); *Y02T 10/7005* (2013.01); *Y02T 10/7066* (2013.01); *Y02T 10/7061* (2013.01); *Y02T 90/14* (2013.01); *Y02T 90/127* (2013.01)
USPC ....................................................... 320/109

(58) Field of Classification Search
CPC ..... H02J 7/0008; H02J 7/0021; H02J 7/0027; H02J 7/14; Y02T 10/70; Y02T 10/7044
USPC .......................... 320/109; 180/65.21; 307/150
See application file for complete search history.

(56) References Cited

U.S. PATENT DOCUMENTS

| | | | |
|---|---|---|---|
| 5,373,195 A | 12/1994 | De Doncker et al. | |
| 5,589,743 A | 12/1996 | King | |
| 5,684,379 A * | 11/1997 | Svedoff | 320/125 |
| 5,803,215 A * | 9/1998 | Henze et al. | 191/2 |
| 5,903,449 A | 5/1999 | Garrigan et al. | |
| 5,926,004 A * | 7/1999 | Henze | 320/109 |
| 5,929,595 A | 7/1999 | Lyons et al. | |
| 6,331,365 B1 | 12/2001 | King | |
| 6,724,100 B1 | 4/2004 | Gabriel | |
| 6,737,822 B2 | 5/2004 | King | |
| 7,049,792 B2 | 5/2006 | King | |

(Continued)

OTHER PUBLICATIONS

Schutten et al., "Characteristics of Load Resonant Converters Operated in a High-Power Factor Mode," IEEE Transactions on Power Electronics, vol. 7, No. 2, Apr. 1992, pp. 304-314.

(Continued)

*Primary Examiner* — Samuel Berhanu
(74) *Attorney, Agent, or Firm* — Ziolkowski Patent Solutions Group, SC; Jean K. Testa (57) ABSTRACT

An energy storage and management system (ESMS) includes energy storage devices coupled to a power device, a power electronic conversion system that includes a plurality of DC electrical converters, each DC electrical converter configured to step up and to step down a DC voltage, wherein energy ports of the ESMS are coupleable to each of the energy storage devices, and each of the energy ports is coupleable to an electrical charging system. The ESMS includes a controller configured to determine a first condition of a first energy storage device and a second condition of a second energy storage device, wherein the first and second energy storage devices are each connected to respective energy ports of the power conversion system, determine a power split factor based on the first condition and on the second condition, and regulate power to the first and second energy storage devices based on the power split factor.

24 Claims, 10 Drawing Sheets

(56) References Cited

U.S. PATENT DOCUMENTS

| | | | |
|---|---|---|---|
| 7,256,516 B2* | 8/2007 | Buchanan et al. | 307/62 |
| 7,427,450 B2 | 9/2008 | Raiser | |
| 7,517,298 B2 | 4/2009 | Ortmann | |
| 7,559,388 B2 | 7/2009 | Severinsky et al. | |
| 2001/0005124 A1* | 6/2001 | Odeohhara et al. | 320/116 |
| 2002/0075003 A1* | 6/2002 | Fridman et al. | 324/426 |
| 2007/0139016 A1* | 6/2007 | Lambert et al. | 320/140 |
| 2008/0218104 A1* | 9/2008 | Lukic et al. | 318/139 |
| 2009/0242291 A1* | 10/2009 | Sagawa et al. | 180/65.265 |
| 2010/0145535 A1* | 6/2010 | Tyler et al. | 700/292 |

OTHER PUBLICATIONS

Balogh, "The Current-Doubler Rectifier: An Alternative Rectification Technique for Push-Pull and Bridge Converters," Unitrode Corporation, Merrimack, NH, Dec. 1994, pp. 1-4.

Mappus, "Current Doubler Rectifier Offers Ripple Current Cancellation," Abstract, Texas Instruments, Dallas, TX, Sep. 2004, pp. 1-8.

* cited by examiner

CHARGER CONFIGURATIONS 200

| | FUNCTION | PORT 1 | PORT 2 | PORT 3 | PORT 4 |
|---|---|---|---|---|---|
| 1 | SINGLE BATTERY W/ INTEGRATED WIDE INPUT RANGE CHARGER | ENERGY BATTERY OR ULTRACAP | U/C BANK | CHARGER INPUT (DC OR RECT. AC) | N.A. |
| 2 | DUAL BATTERY W/ INTEGRATED WIDE INPUT RANGE CHARGER | ENERGY BATTERY OR ULTRACAP | POWER BATTERY | CHARGER INPUT (DC OR RECT. AC) | N.A. |
| 3 | TRIPLE BATTERY W/ INTEGRATED WIDE INPUT RANGE CHARGER | ENERGY BATTERY I OR ULTRACAP | POWER BATTERY | CHARGER INPUT (DC OR RECT. AC) | ENERGY BATTERY II OR ULTRACAP |
| 4 | BOOST BATTERY W/ LOW VOLTAGE CHARGER | ENERGY BATTERY | POWER BATTERY | POWER BATTERY | CHARGER INPUT |
| 5 | DUAL BATTERY W/ INTEGRATED WIDE INPUT RANGE CHARGER AND INTERLEAVING IN NORMAL OPERATION | ENERGY BATTERY | POWER BATTERY | CHARGER INPUT (DC OR RECT. AC) | PARALLEL CONNECTED TO PORT 1 |

SINGLE HV BATTERY CHARGING

| $V_{P2}$, $V_{P3}$ | $V_{P1}$, $V_{P4}$ | STATE SELECTION / OPERATING MODES | K3 | K1 | K2 | K4 | M |
|---|---|---|---|---|---|---|---|
| CASE 1<br>$V_{P3} < V_{P2}$ | N/A | M2 UPPER SWITCH PERMANENTLY ON, M1 IN BOOST CURRENT CONTROL MODE CHARGE PORT P2 | CLOSED | OPEN | OPEN | OPEN | CLOSED |
| CASE 2<br>$V_{P2} < V_{P3}$ | N/A | M2 IN BUCK CURRENT CONTROL MODE, USE D IN M1 TO CHARGE PORT P2 | CLOSED | OPEN | OPEN | CLOSED | CLOSED |

FIG. 9

SINGLE LV BATTERY CHARGING (ON EITHER PORT 1 OR PORT 4)

| $V_{P2}$, $V_{P3}$ | $V_{P1}$, $V_{P4}$ | STATE SELECTION / OPERATING MODES | K3 | K1 | K2 | K4 | M |
|---|---|---|---|---|---|---|---|
| CASE 3<br>$V_{P3} < V_{P1}$ [$V_{P4}$] | N/A | M2 UPPER SWITCH PERMANENTLY ON, M1 IN BOOST AND M3 IN BUCK MODE CURRENT CONTROL MODE CHARGE PORT P1 [P4]. DC LINK CAPACITORS ARE USED ON PORT P2 | CLOSED | OPEN | OPEN [CLOSED] | CLOSED [OPEN] | OPEN |
| CASE 4<br>$V_{P3} < V_{P1}$ [$V_{P4}$] | N/A | M2 IN BUCK CURRENT CONTROL MODE TO CHARGE PORT P1 [P4]. | CLOSED | CLOSED | OPEN [CLOSED] | OPEN [CLOSED] | OPEN |

FIG. 10A

DUAL BATTERY CHARGING

| $V_{P1}$, $V_{P2}$, $V_{P3}$ | $V_{P4}$ | STATE SELECTION / OPERATING MODES | K3 | K1 | K2 | K4 | M |
|---|---|---|---|---|---|---|---|
| CASE 5 $V_{P1} < V_{P3} < V_{P2}$ $V_{P1} + \Delta V < V_{P3} < V_{P2} - \Delta V$ $\Delta V = 10V$ | N/A | M2 IN BUCK CURRENT CONTROL MODE, M1 IN BOOST CURRENT CONTROL MODE, SIMULTANEOUSLY CHARGE PORT P1 & P2 | CLOSED | CLOSED | OPEN | OPEN | CLOSED |
| CASE 6 $V_{P3} < V_{P1} < V_{P2}$ | N/A | M2 UPPER SWITCH PERMANENTLY ON, M1 IN BOOST CURRENT CONTROL MODE CHARGE PORT 2, M3 IN BUCK CURRENT CONTROL MODE CHARGE PORT P1 THE CONTROL OBJECTIVE IS TO KEEP ALWAYS $V_{P2} > V_{P1}$ | CLOSED | OPEN | OPEN | CLOSED | CLOSED |
| CASE 7 $V_{P3} \approx V_{P1} < V_{P2}$ $V_{P3}$ AND $V_{P1}$ ARE EQUAL WITHIN $\Delta V$ | N/A | M2 UPPER SWITCH PERMANENTLY ON, M1 IN BOOST CURRENT CONTROL MODE CHARGE PORT 2, M3 IN BUCK CURRENT CONTROL MODE CHARGE PORT P1 | CLOSED | OPEN | OPEN | CLOSED | CLOSED |
| CASE 8 $V_{P1} < V_{P2} < V_{P3}$ | N/A | M2 IN BUCK CURRENT CONTROL MODE, CHARGE PORT 1, M1 IN BOOST CURRENT CONTROL MODE | CLOSED | CLOSED | OPEN | OPEN | CLOSED |

FIG. 10B

| | | | | | | | |
|---|---|---|---|---|---|---|---|
| CASE 9 $V_{P2} < V_{P1} < V_{P3}$ | N/A | SEQUENCED DUAL BATTERY CHARGING: (1) M2 IN BUCK CURRENT CONTROL MODE, M1 UPPER SWITCH PERMANENTLY ON TO CHARGE PORT P2 UNTIL $V_{P2} < V_{P1}$ | CLOSED | OPEN | OPEN | OPEN | CLOSED |
| | | (2) CLOSE K4 AND OPERATE M3 IN BUCK CURRENT CONTROL MODE TO CHARGE PORT P1 | CLOSED | OPEN | OPEN | CLOSED | CLOSED |
| CASE 10 $V_{P3} < V_{P2} < V_{P1}$ | N/A | SEQUENCED DUAL BATTERY CHARGING: (1) M2 UPPER SWITCH PERMANENTLY ON, M1 IN BOOST CURRENT CONTROL MODE CHARGE PORT P2 UNTIL $V_{P2} > V_{P1}$ | CLOSED | OPEN | OPEN | OPEN | CLOSED |
| | | (2) CLOSE K4, M3 IN BUCK CURRENT CONTROL MODE CHARGE PORT P1 SIMULTANEOUSLY CHARGE P2 TO KEEP VOLTAGE LEVEL UP | CLOSED | OPEN | OPEN | OPEN | CLOSED |

FIG. 10C

APPARATUS AND METHOD FOR CHARGING AN ELECTRIC VEHICLE

BACKGROUND OF THE INVENTION

Embodiments of the invention relate generally to electric drive systems including hybrid and electric vehicles and, more particularly, to charging energy storage devices of an electric vehicle using a multiport energy management system.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while internal combustion engines (ICEs) may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy (such as a low-voltage battery) while a second source of stored electrical energy may be used to provide higher-power energy for, for example, acceleration (such as a high-voltage battery or an ultracapacitor).

Plug-in electric vehicles, whether of the hybrid electric type or of the purely electric type, are configured to use electrical energy from an external source to recharge the energy storage devices. Such vehicles may include on-road and off-road vehicles, golf carts, neighborhood electric vehicles, forklifts, and utility trucks as examples. These vehicles may use either off-board stationary battery chargers, on-board battery chargers, or a combination of off-board stationary battery chargers and on-board battery chargers to transfer electrical energy from a utility grid or renewable energy source to the vehicle's on-board traction battery. Plug-in vehicles may include circuitry and connections to facilitate the recharging of the traction battery from the utility grid or other external source, for example.

Battery chargers are important components in the development of electric vehicles (EVs). Historically, two types of chargers for EV application are known. One is a standalone type where functionality and style can be compared to a gas station to perform rapid charging. The other is an on-board type, which would be used for slower C-rate charging from a conventional household outlet. EVs typically include energy storage devices such as low voltage batteries (for range and cruising, for example), high voltage batteries (for boost and acceleration, for example), and ultracapacitors (for boost and acceleration, for example), to name a few. Because these energy storage devices operate under different voltages and are charged differently from one another, typically each storage device includes its own unique charging system. This can lead to multiple components and charging systems because the storage devices typically cannot be charged using charging systems for other storage devices. In other words, a charging device used to charge a low-voltage battery typically cannot be used to charge an ultracapacitor or a high-voltage battery.

The effect (i.e., many devices) is generally compounded when considering that in some applications it is desirable to rapidly charge the storage devices using a "gas station" type charging system, while in other applications it is desirable to slow-charge the storage device using a conventional household outlet. However, when multiple energy storage devices of an EV needs charging, such as power batteries, energy batteries, and ultracapacitors, often they do not need the same amount of recharging. For instance, one energy storage device may be nearly or fully depleted and have nearly zero state-of-charge (SOC) while another, at the same time, may be only partially depleted and have a much greater SOC. Or, energy storage devices often comprise a pack or bank of storage cells that can become unbalanced in their amount of energy stored therein. And, as known in the art, the devices typically have vastly different storage capacities, and different operating voltages from one another, as examples.

As such, during a re-charging session of all devices of an EV, re-charging the devices may be inefficient and needlessly time-consuming, overall, because one device may be preferentially charged much quicker to a full state-of-charge (SOC) while another device is charged and reaches its full SOC in a much longer time period.

It would therefore be desirable to provide an apparatus to reduce the overall recharge time for multiple energy storage devices of an EV.

BRIEF DESCRIPTION OF THE INVENTION

The invention is a method and apparatus for minimizing a total recharge time for multiple energy storage devices of an EV.

According to one aspect of the invention, an energy storage and management system (ESMS) includes one or more energy storage devices coupled to a power device and configured to store electrical energy, a power electronic conversion system having a plurality of energy ports, the power electronic conversion system comprising a plurality of DC electrical converters, each DC electrical converter configured to step up and to step down a DC voltage, wherein each of the plurality of energy ports is coupleable to each of the one or more energy storage devices, and each of the plurality of energy ports is coupleable to an electrical charging system. The ESMS includes a controller configured to determine a first condition of a first energy storage device and a second condition of a second energy storage device, wherein the first and second energy storage devices are each connected to respective energy ports of the power conversion system, determine a power split factor based on the first condition and on the second condition, and regulate power to the first and second energy storage devices based on the power split factor.

In accordance with another aspect of the invention, a method of managing an energy storage and management system (ESMS) includes determining a first charge status of a first energy storage device, determining a second charge status of a second energy storage device, determining a power split factor based on the first charge status and the second charge status, and regulating charging power to the first and second energy storage devices consistent with the power split factor.

In accordance with yet another aspect of the invention, a non-transitory computer readable storage medium positioned on an energy storage and management system (ESMS) and having stored thereon a computer program comprising instructions which when executed by a computer cause the computer to determine an electrical status of a first energy storage device and of a second energy storage device, wherein the first and second energy storage devices are each connected to respective energy ports of the ESMS, determine a power split factor based on the electrical status of the first and second energy storage devices, and regulate power to the first and second energy storage devices based on the power split factor.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIGS. 10 A-C are a table illustrating aspects of contactor settings, with comments for dual battery charging to ports 1 and 3.

DETAILED DESCRIPTION

Figure 1:
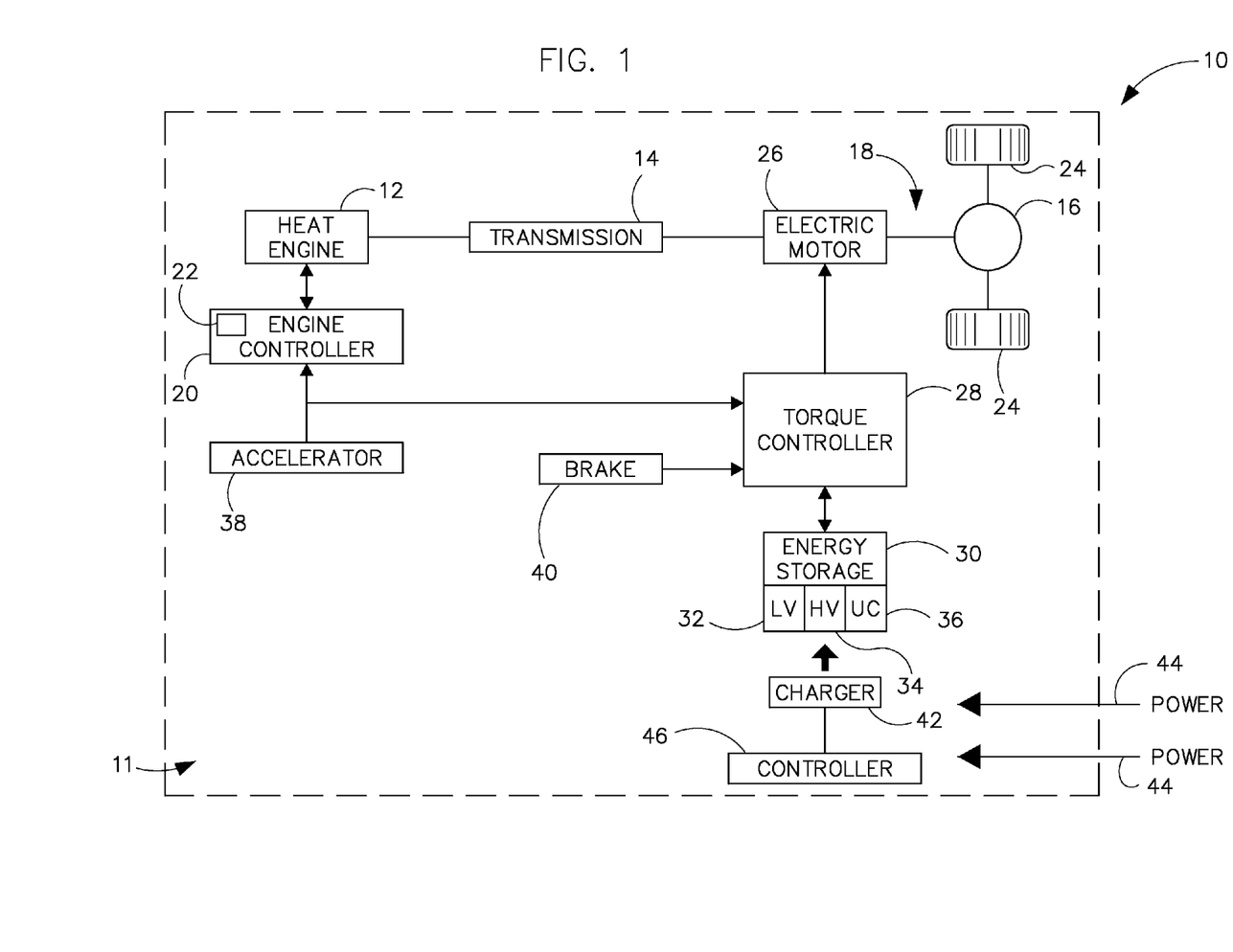
FIG. 1 is a schematic block diagram of an electric vehicle (EV) incorporating embodiments of the invention.

FIG. 1 illustrates one embodiment of a hybrid electric vehicle (HEV) or electric vehicle (EV) 10, such as an automobile, truck, bus, or off-road vehicle, for example, incorporating embodiments of the invention. In other embodiments vehicle 10 includes one of a vehicle drivetrain, an uninterrupted power supply, a mining vehicle drivetrain, a mining apparatus, a marine system, and an aviation system. Vehicle 10 includes an energy storage and management system (ESMS) 11 internal combustion or heat engine 12, a transmission 14 coupled to engine 12, a differential 16, and a drive shaft assembly 18 coupled between transmission 14 and differential 16. And, although ESMS 11 is illustrated in a plug-in hybrid electric vehicle (PHEV), it is understood that ESMS 11 is applicable to any electric vehicle, such as a HEV or EV or other power electronic drives used to operate pulsed loads, according to embodiments of the invention. According to various embodiments, engine 12 may be an internal combustion gasoline engine, an internal combustion diesel engine, an external combustion engine, or a gas turbine engine, as examples. ESMS 11 includes an engine controller 20 provided to control operation of engine 12. According to one embodiment, engine controller 20 includes one or more sensors 22 that are configured to sense operating conditions of engine 12. Sensors 22 may include an rpm sensor, a torque sensor, an oxygen sensor, and a temperature sensor, as examples. As such, engine controller 20 is configured to transmit or receive data from engine 12. Vehicle 10 also includes an engine speed sensor (not shown) that measures a crankshaft speed of engine 12. According to one embodiment, speed sensor may measure engine crankshaft speed from a tachometer (not shown) in pulses per second, which may be converted to a revolutions per minute (rpm) signal.

Vehicle 10 also includes at least two wheels 24 that are coupled to respective ends of differential 16. In one embodiment, vehicle 10 is configured as a rear wheel drive vehicle such that differential 16 is positioned near an aft end of vehicle 10 and is configured to drive at least one of the wheels 24. Optionally, vehicle 10 may be configured as a front-wheel drive vehicle.

In one embodiment, transmission 14 is a manually operated transmission that includes a plurality of gears such that the input torque received from engine 12 is multiplied via a plurality of gear ratios and transmitted to differential 16 through drive shaft assembly 18. According to such an embodiment, vehicle 10 includes a clutch (not shown) configured to selectively connect and disconnect engine 12 and transmission 14.

Vehicle 10 also includes an electromechanical device such as an electric motor or electric motor/generator unit 26 coupled along drive shaft assembly 18 between transmission 14 and differential 16 such that torque generated by engine 12 is transmitted through transmission 14 and through electric motor or electric motor/generator unit 26 to differential 16. A speed sensor (not shown) may be included to monitor an operating speed of electric motor 26. According to one embodiment, electric motor 26 is directly coupled to transmission 14, and drive shaft assembly 18 comprises one axle or drive shaft coupled to differential 16.

A hybrid drive control system or torque controller 28 is provided to control operation of electric motor 26 and is coupled to motor/generator unit 26. An energy storage system 30 is coupled to torque controller 28 and comprises a low voltage energy storage or energy battery 32, a high voltage energy storage or power battery 34, and an ultracapacitor 36, as examples. However, although a low voltage energy storage 32, a high voltage energy storage 34, and an ultracapacitor 36 are illustrated, it is to be understood that energy storage system 30 may include a plurality of energy storage units as understood in the art such as sodium metal halide batteries, sodium nickel chloride batteries, sodium sulfur batteries, nickel metal hydride batteries, lithium ion batteries, lithium polymer batteries, nickel cadmium batteries, a plurality of ultracapacitor cells, a combination of ultracapacitors and batteries, or a fuel cell, as examples. An accelerator pedal 38 and brake pedal 40 are also included in vehicle 10. Accelerator pedal 38 is configured to send throttle command signals or accelerator pedal signals to engine controller 20 and torque control 28.

SMS 11 includes a charger 42 coupled to energy storage units 32-36 of energy storage system 30, according to embodiments of the invention. Charger 42 may be coupled to multiple energy storage systems 32-36, as illustrated and charger 42 may be coupled to one or multiple power input lines 44, two of which are illustrated, according to embodiments of the invention. That is, charger 42 illustrates an embodiment of the invention, and charger 42 may be coupled to one or multiple energy storage systems, and charger 42 may be coupled to one or multiple power input systems 44, according to embodiments illustrating use of the invention. Charger 42 includes a controller 46 that is configured to selectively engage and disengage DC electrical devices or buck-boost modules of charger 42 as will be discussed.

And, although charger 42 is illustrated as being coupled to energy storage systems 32-36, and charger 42 is illustrated as coupled to one or multiple power input lines 44, it is to be understood that embodiments of the invention are not to be so limited. Instead, it is to be understood that charger 42 may be coupled to multiple and varying types of energy storage systems and power inputs. Further, it is to be understood that there may be multiple chargers 42 per vehicle in parallel, or that there may be power systems applied to each wheel 24 of vehicle 10, each having a charger 42 coupled thereto.

In operation, it is understood in the art that energy may be provided to drive shaft assembly 18 from internal combustion or heat engine 12 via transmission 14, and energy may be provided to drive shaft assembly 18 via drive control system 28 having energy drawn from energy storage system 30 that may include energy systems 32-36. Thus, as understood in the art, energy may be drawn for vehicle 10 boost or acceleration from, for instance a high voltage storage device 34 that may include a battery, as an example, or from ultracapacitor 36. During cruising (i.e., generally non-accelerating operation), energy may be drawn for vehicle 10 via a low voltage storage device such as low voltage energy storage 32.

And, during operation, energy may be drawn from internal combustion or heat engine 12 in order to provide energy storage 30 or provide power to drive shaft assembly 18 as understood in the art. Further, some systems include a regenerative operation where energy may be recovered from a braking operation and used to re-charge energy storage 30. In addition, some systems may not provide regenerative energy recovery from braking and some systems may not provide a heat engine such as internal combustion or heat engine 12. Nevertheless and despite the ability of some systems to re-charge energy storage 30, energy storage 30 periodically requires re-charging from an external source such as a 115 V household supply or a 230 V 3-phase source, as examples. The requirement to re-charge energy storage 30 is particularly acute in a plug-in hybrid electric vehicle (PHEV) having no heat engine to provide power and an extended range of driving operation.

Thus, embodiments of the invention are flexible and configurable having a plurality of energy ports, and may be coupled to multiple power sources and source types in order to charge one or multiple energy storage types. Further, as will be illustrated, embodiments of the invention allow efficient and balanced charging of multiple energy systems 32-36 of energy storage unit 30, the multiple energy systems having varying levels of depletion.

To meet the demands of modern PHEVs and EVs, the infrastructure should provide typically 7 kW to achieve a state-of-charge (SOC) gain of 80% (assuming a 25 kWh battery) in a charging time of 2 or 3 hours (home charging). For a more aggressive short stop fast charging scenario (e.g., a "gas station") significant higher power levels may be required to achieve a desired 80% SOC in 10 minutes. The vehicle interface needs to be designed according to existing standards. A pilot signal determines by its duty cycle the maximum allowable power. Besides a high degree of integration the proposed system provides also single and or three phase AC input, high efficiency, low harmonics, nearly unity input power factor, low cost, low weight and safety interlocking of the equipment. The power factor correction (PFC) requirement may be driven by IEC/ISO/IEEE line harmonic current regulations, as known in the art.

Illustrated in the following figures is an energy management system with an integrated charger unit consisting of three bi-directional buck-boost stages and a charger front end. The system includes also a charger module for high voltage DC and standard AC outlet charging.

This invention is applicable to conventional electric vehicles (EVs) as well as grid-charged hybrid electric vehicles (PHEVs). Grid-charged HEVs provide the option to drive the vehicle for a certain number of miles (i.e., PHEV20, PHEV40, PHEV60). Traditionally, the goal for PHEVs is to provide a high all-electric-range (AER) capability to lower operating cost and be able to optimize the operating strategy. In terms of the buck-boost stages, the charger front-end and interface, it generally makes no difference if it is designed for an EV or PHEV application. The role of the DC/DC converter is an efficient energy transfer between two or more energy sources, reliable for continuous and peak power demands. The integration of the charger unit is the next step towards a higher power density design with fewer components and therefore higher reliability. As such, embodiments of the invention are applicable to multiple electric vehicles, including all-electric and hybrid electric vehicles, as examples, designated generally and broadly as "EV"s. Such EVs may include but are not limited to road vehicles, golf carts, trains, and the like, capable of having power systems that include an electric component for causing motion of the vehicle.

In conventional implementations many separate units coexist, to include generally a separate charger, battery management and control unit that are interconnected. In an automotive environment with advanced batteries, communications between the charger and battery is an important consideration. In such environments seamless integration with batteries from different battery vendors is also an important consideration. The energy management system with integrated charger is advantageous in that aspect that there is less integration effort required and fewer components improve reliability.

Figure 2:
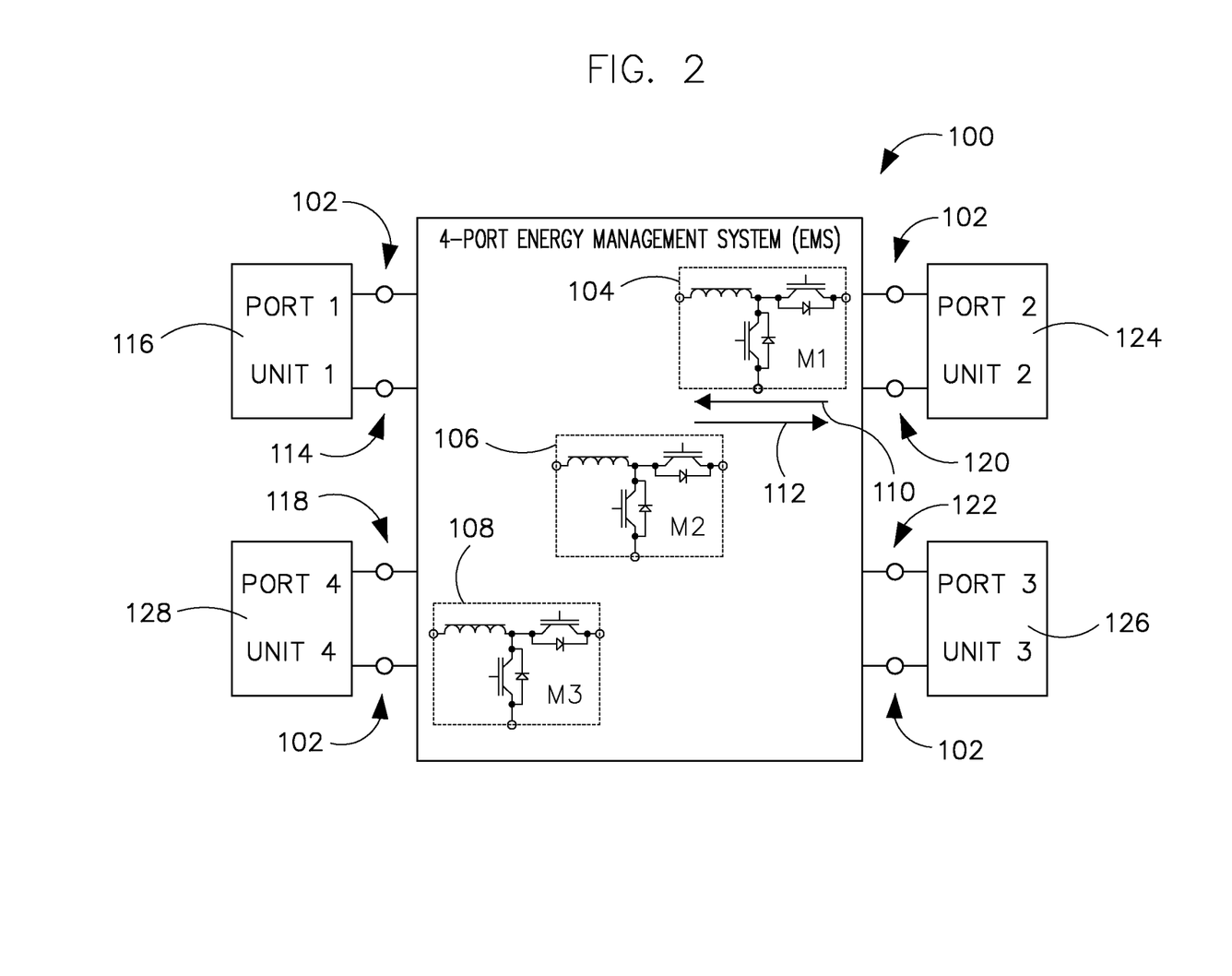
FIG. 2 is a schematic diagram of a configurable multi-port charger architecture according to an embodiment of the invention.

Referring now to FIG. 2, a configurable multi-port integrated charger architecture, energy storage and management system (ESMS, otherwise referred to as energy management system (EMS)) ESMS 100, such as charger 42 is illustrated having four energy ports 102 and three DC electrical conversion devices or buck-boost converters respectively as modules 1, 2, and 3 (104, 106, 108). As known in the art, buck-boost converters 104-108 may be configured to operate in either a buck-mode by flowing electrical energy therethrough in a first direction 110 (illustrated with respect to buck-boost converter 104, but equally applicable to converters 106 and 108), or a boost mode by flowing electrical energy in a second direction 112 (illustrated again with respect to buck-boost converter 104, but equally applicable to converters 106 and 108). As illustrated, energy ports 102 comprise a first energy port P1 114 configurable to have a first unit 116 attached or electrically coupled thereto. Similarly, energy ports 102 comprise fourth, second, and third energy ports P2 118, P3 120, and P4 122 that are configurable to have respective second unit 124, third unit 126, and fourth unit 128 attached or electrically coupled thereto.

According to the invention the charger is part of the vehicle design and mounted on-board. The integrated on-board charger is capable of continuously adjusting input currents to energy ports 114 and 118-120 as a result of, for instance, varying SOC of devices connected thereto for charging.

As will be illustrated, ESMS 100 of FIG. 2 may be configured to charge up to three energy sources (to include low voltage energy batteries, high voltage power batteries, ultra-capacitors, as examples) at the same time or simultaneously. ESMS 100 may have modules therein configured to be interleaved in order to lower ripple current. ESMS 100 also is capable of having multiple charging profiles as a function of conditions that include SOC and temperature, as examples, for different battery technologies and storage device types. ESMS 100 includes a centralized energy flow control that is centrally controlled by controller 46 of FIG. 1, and ESMS 100 is capable of managing a wide range of input and output voltages.

Figure 3:
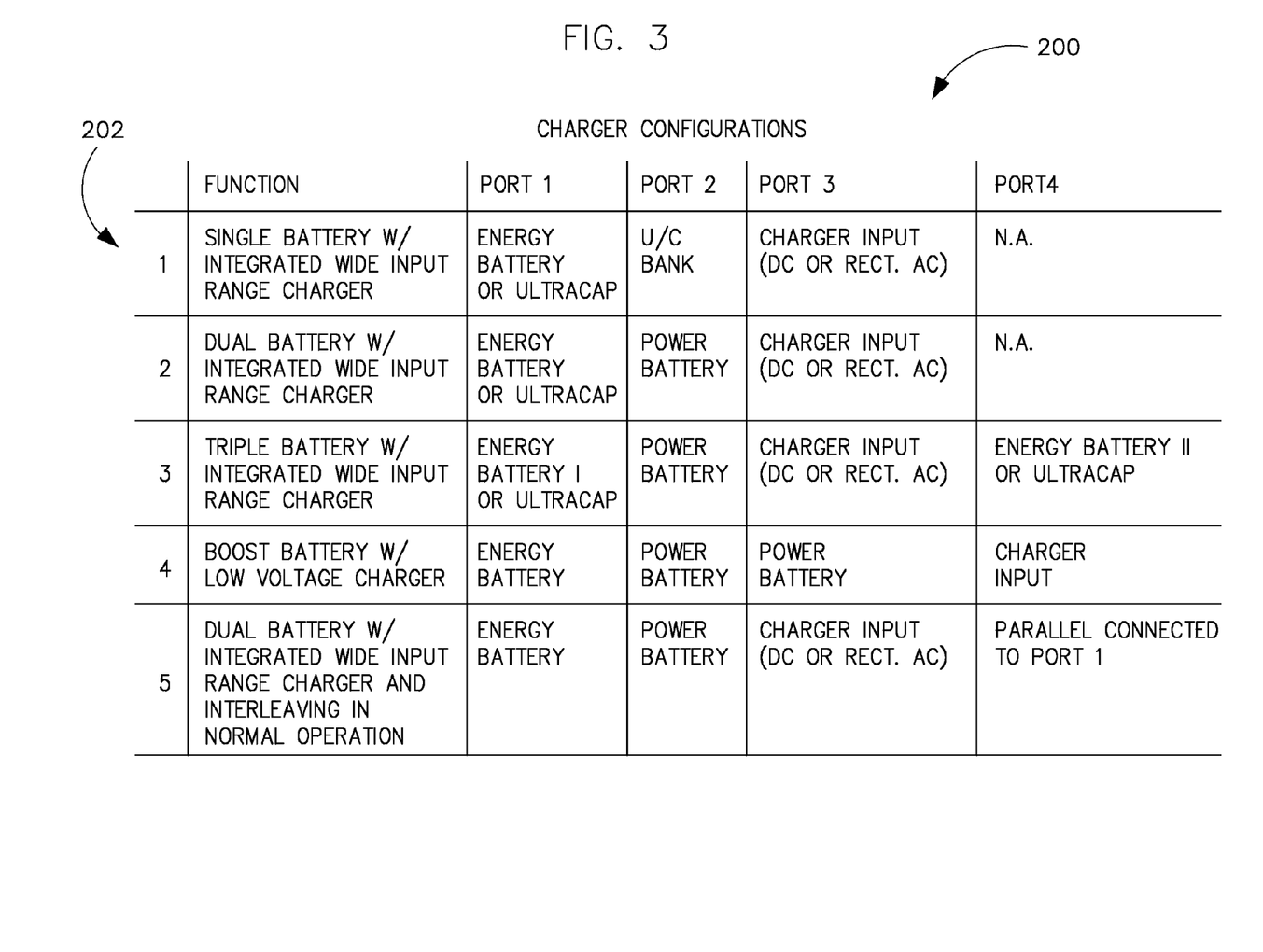
FIG. 3 is a table illustrating configurations as of the multi-port charger illustrated in FIG. 2.

ESMS 100 of FIGS. 1 and 2 is configurable in multiple configurations, some of which are illustrated in FIG. 3 as a table 200. Each configuration of ESMS 100 may be selectable by contactors (not illustrated), as understood in the art, and energy flow is controlled by ESMS control algorithms, implemented in controller 46 of hybrid vehicle 10, which can sense a presence of both energy storage devices and charging devices connected to ports 102 and adjust a flow of direction of energy, accordingly. For instance, the control algorithms may determine a voltage of each port to which an energy storage device or an electrical charging system (DC or rectified AC, as examples) is coupled, and operate ESMS 100 accordingly and based on the determined voltages, based on a measured frequency, or both (as examples). And, a benefit for including a rectifier is that even if DC is connected having the wrong polarity, the rectifier provides protection, even if a single phase rectifier is used or if a DC input is used to two of the 3-phase inputs for a 3-phase rectifier.

The wide input voltage integrated charger allows independent and simultaneous charging of two or more batteries of any SOC level respectively from any input voltage level within the voltage limit of ESMS components. The input voltage can range from typical single phase voltages (110V/120V), to 208V/240V and up to 400V or even higher (level 1 . . . 4). The highest currently specified voltage is 400V for rapid DC charging, however with proper selection of ESMS components, up to 480V single or 3-phase AC or even 600 V DC can be utilized to provide higher level of charging for shorter time duration (i.e., fast charging). An energy battery is either connected to first energy port 114 or fourth energy port 118 and has typically lower nominal voltages than the power battery on second energy port 120. The use of short time energy storage devices (ultracapacitors) on first energy port 114 has some advantages as will be shown later.

Figure 4:
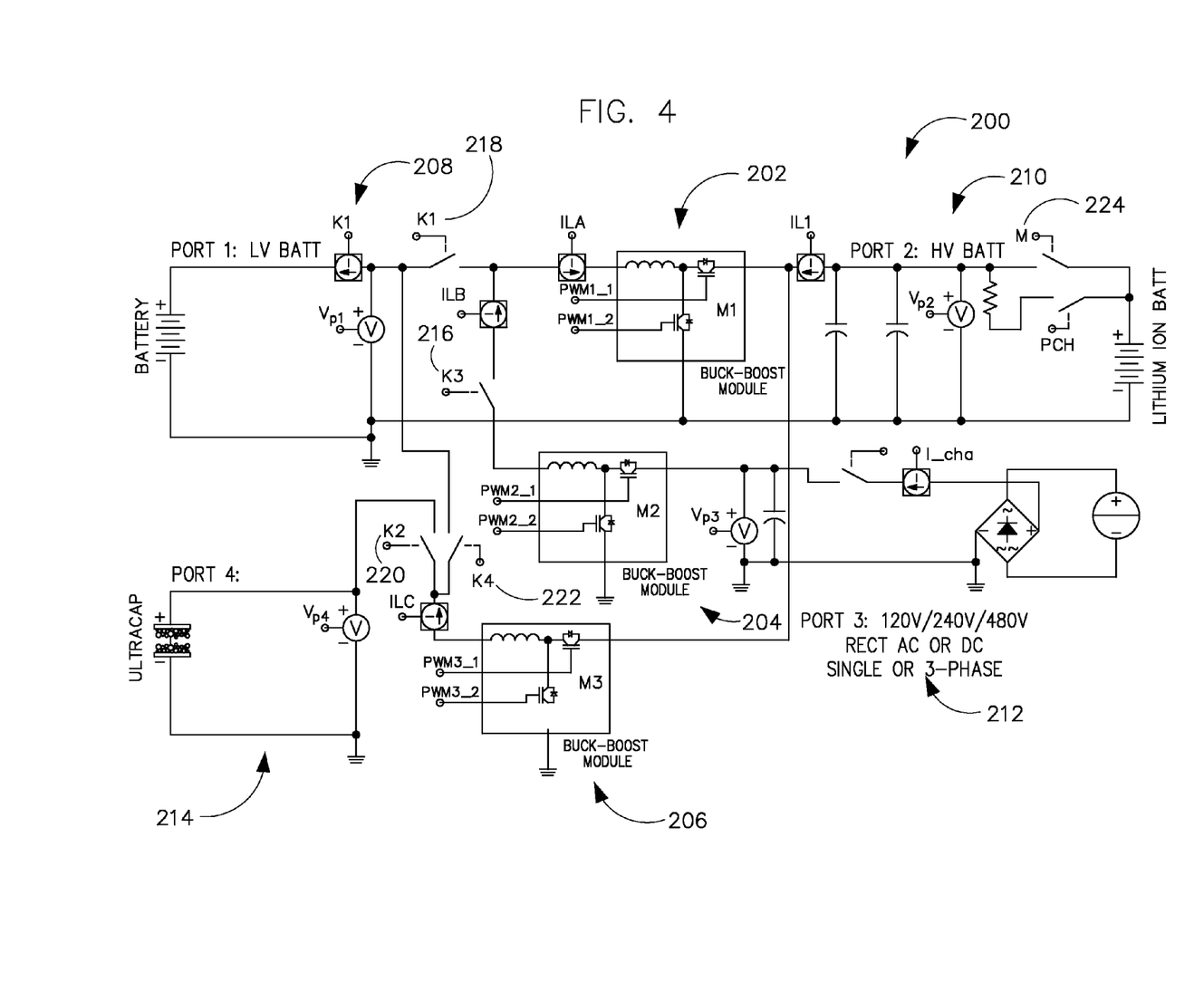
FIG. 4 illustrates an electrical schematic of a multi-port charger according to an embodiment of the invention.

FIG. 4 illustrates a block diagram of a multi-port ESMS according to an embodiment of the invention. For simplicity, control electronic components are omitted. Thus, ESMS 200 illustrates a first buck-boost module 202, a second buck-boost module 204, and a third buck-boost module 206. ESMS 200 also illustrates port P1 208 having a low voltage battery coupled thereto, port P2 210 having a high voltage unit coupled thereto, port P3 212 having a rectified AC or DC voltage coupled thereto, and port P4 214 having a low voltage ultracapacitor coupled thereto. Thus, in the example illustrated, energy storage devices and an energy charger are coupled to ESMS 200 in order to illustrate operation according to one configuration. However, as discussed, ESMS 200 may be configured in numerous arrangements in order to accommodate multiple charger/energy storage arrangements. As such, ESMS 200 includes contactors K3 216, K1 218, K2 220, K4 222, and M 224 which may be selectively engaged or disengaged in order to accomplish configurations for charging, according to the illustrations above.

Each of the three buck-boost modules M1 202, M2 204, M3 206 includes an IGBT leg (upper and lower switch) and an inductor. The high voltage DC bus may be buffered by a number of power capacitors. Each buck-boost converter stage output is equipped with a current sensor, which measures an inductor current. Voltage limits shown at port P3 212 are originated by typical single-phase AC outlet voltages in both the US and Europe. However, in applications requiring higher levels of charge power, port P3 can be coupled to 208V, 240V, or 480V 3-phase, or either 400 V DC or up to 600 V DC.

ESMS 200 uses contactors as main bus and individual module switches. A pre-charge circuit is realized using two power resistors (e.g., 120 ohm, 100 W, RH-50) and a contactor or FET. An additional contactor (K4 222 in FIG. 4) serves in two cases. One is under a certain SOC condition of a battery at port P1 208, and the second if interleaving of module 1 202 and module 3 206 is enabled. FIG. 4 illustrates voltage and current sense points of ESMS 200 having an integrated charger.

Single and Dual Battery Charging Control

Charging in a dual battery configuration as shown here allows charging from a wide input voltage range of batteries with an arbitrary SOC level for both batteries. The internal architecture of the multi-port integrated charger with its software features only allows this.

Upon power up ESMS 200 control recovers the type of energy storage units that are being used, their energy ratings and limits for charging current and power. From the communication interface to the electric vehicle supply equipment (EVSE) the ESMS sets limits for input current and eventually the type of power source (AC or DC).

Figure 5:
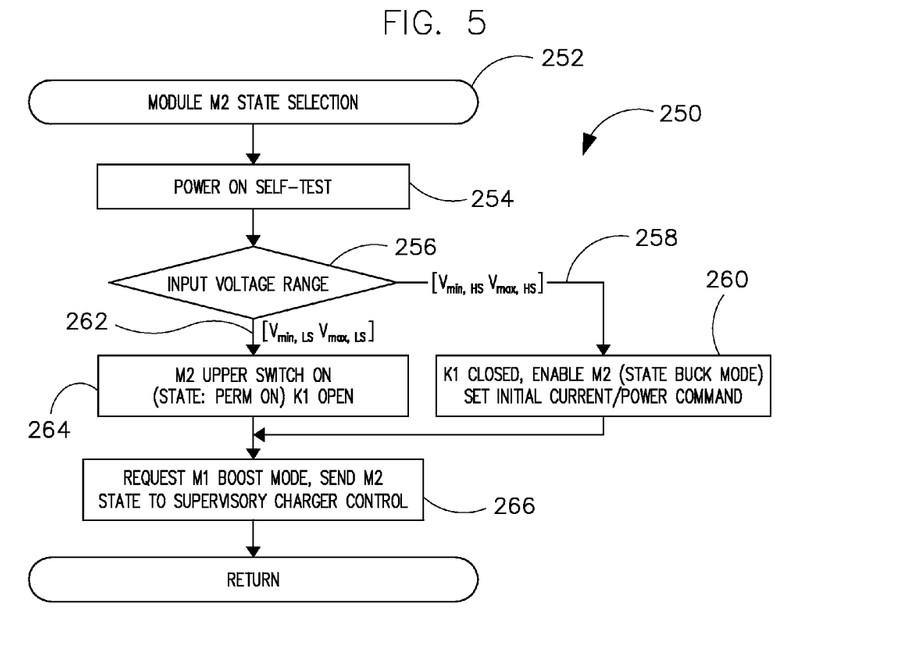
FIG. 5 illustrates a control scheme, as an example, specific to module M2 of FIG. 2.

Each buck-boost module runs an independent state machine. The states are disabled/standby, buck mode enabled, boost mode enabled or enabled permanent conducting upper switch (specific to module 2 106 as illustrated in FIG. 5 as sequence 250). Module state selection occurs at step 252 and power on self-test occurs at step 254. Input voltage range is determined at step 256 and if $V_{min}$ and $V_{max}$ are on the high side 258, then switch K2 220 is closed and module M2 204 is enabled 260, causing module M2 204 to operate in buck mode. If $V_{min}$ and $V_{max}$ are on the low side 262, then switch K1 218 is opened and module M2 upper switch is on, causing module M2 204 to be permanently on 264. At step 266, module M1 202 is requested and the state of module M2 204 (i.e., buck mode at step 202 or permanently on at step 264) is returned at step 268 for further operation. Part of this sequence is also to force the contactors into the right state. For charging generally contactor K3 216 is closed to allow the use of modules M1 202 and M2 204 for controlled charging of the port P2 210 energy storage device. In this sequence of the charging control the software distinguishes several cases that might apply and selects the appropriate state of each of the three buck-boost modules 202-206.

In the start-up sequence and before any contactor is forced to the ON state and before the modules and switching of the IGBTs are enabled, ESMS 200 control acquires the voltage levels of all used energy sources and determines the charger input voltage. This is done in order to avoid any possible uncontrolled current when for example the voltage on the low side of the buck-boost module is higher than the voltage on the high side. This can be the case for example when the power battery on the high side is deeply discharged and the energy storage devices on port P1 208 and/or port P4 214 still have a significant amount of energy stored. This is a scenario that is typically avoided by normal operation energy management of the vehicle, but it might be possible if the high side energy storage device is replaced and not charged up prior to replacement, or the normal operation energy management was not active for long time for some reason. The integrated charger control can handle even very extreme and unusual voltage levels at all four ports 208-214 and allows controlled energy management to bring the system back to normal operation.

In one mode of operation the charger control establishes a charging current into the high side energy storage device at port P2 210. This is referred to as the single HV battery charging mode. Module M1 202 operates in boost mode, contactors K3 216 and M 224 are closed, while contactors K1 218, K2 220 and K4 222 are open. Depending on the charger input voltage, module M2 204 is in buck mode ($Vp_3 > Vp_2$) or the upper switch is permanently conducting ($Vp_3 < V_{p2}$). The charging current is controlled through module M1 202. Depending on the charging strategy, the SOC or the voltage level of the device at port P2 210 the control determines the charging current and the time of operation in this mode.

As an extension to the mode described before, the charger control enables charging of a second energy storage device on either port P1 208 or port P4 214. This may be referred to as a dual battery charging mode. In this mode the control ensures that a controlled current flow is possible before closing the contactors and enabling module M3 206. If the voltage levels are in permissible range either contactor K2 220 or K4 222 are forced into ON state, module M3 206 is set into buck mode and determines the charging current and the time of operation in this mode. An initial power split factor is applied while currents and voltages are constantly monitored to calculate each individual SOC. By using a commercial off the shelf (COTS) battery pack, the standardized communication interface of the integrated charger ESMS also allows to receive voltage and SOC from the system. The integrated charger ESMS executes the desired charging strategy, which depends on battery technology, thermal constraints, etc.

Figure 6:
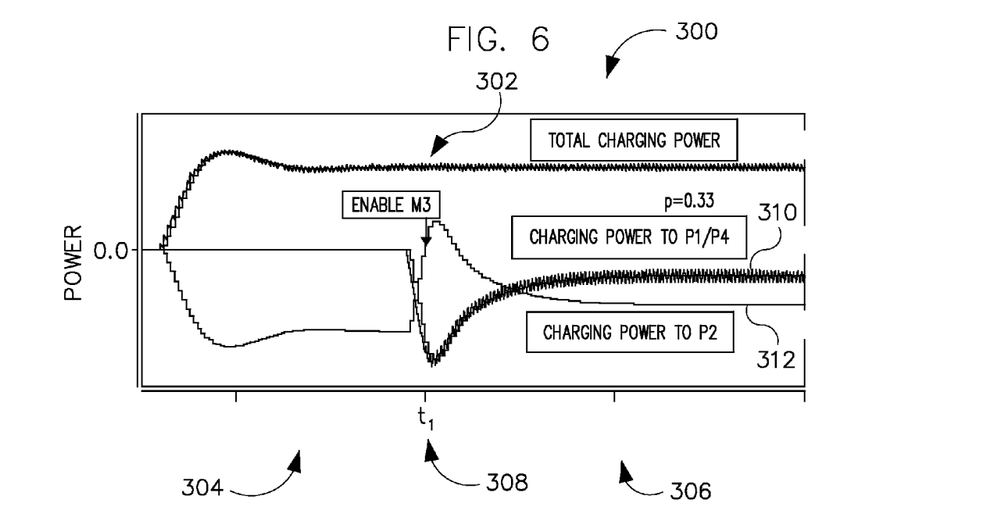
FIG. 6 illustrates an exemplary control sequence for dual battery charging, according to an embodiment of the invention.

SOC of attached energy storage devices is estimated to determine a power split from the wide voltage input to the energy storage devices. Individual device SOC is constantly monitored to determine and optimize the power split factor. This task is responsible for handling extreme SOC levels appropriately. For example, a fully discharged high side battery on port P2 210 might operate at voltages that are below the battery on port P1 208. In this case charging up the high side battery on port P2 210 is required before a charge power split can be performed. FIG. 6 illustrates an example of a power split selection of p=0.33, which means that 33% of the overall charging power is flowing into either a port P1 208 device, a port P4 device 214, or both ports 208, 214. Referring to FIG. 6, a charging example 300 is illustrated in which a total charging power 302 is provided during a first phase 304 and a second phase 306 of charging. During first phase 304, all charging power of total charging power 302 is provided to port P2 210 until adequate voltage is obtained on the HV device that is attached thereto. In the example of FIG. 6, this occurs at $t_1$ 308 (which, in one example, is 15 minutes). A $t_1$ 308, module M3 206 is enabled and power is split with, as stated in this example, 33% of overall charging power being directed to one or both of ports P1/P4 208/214 310, and the balance of power being directed to port P2 210 312.

Figure 7:
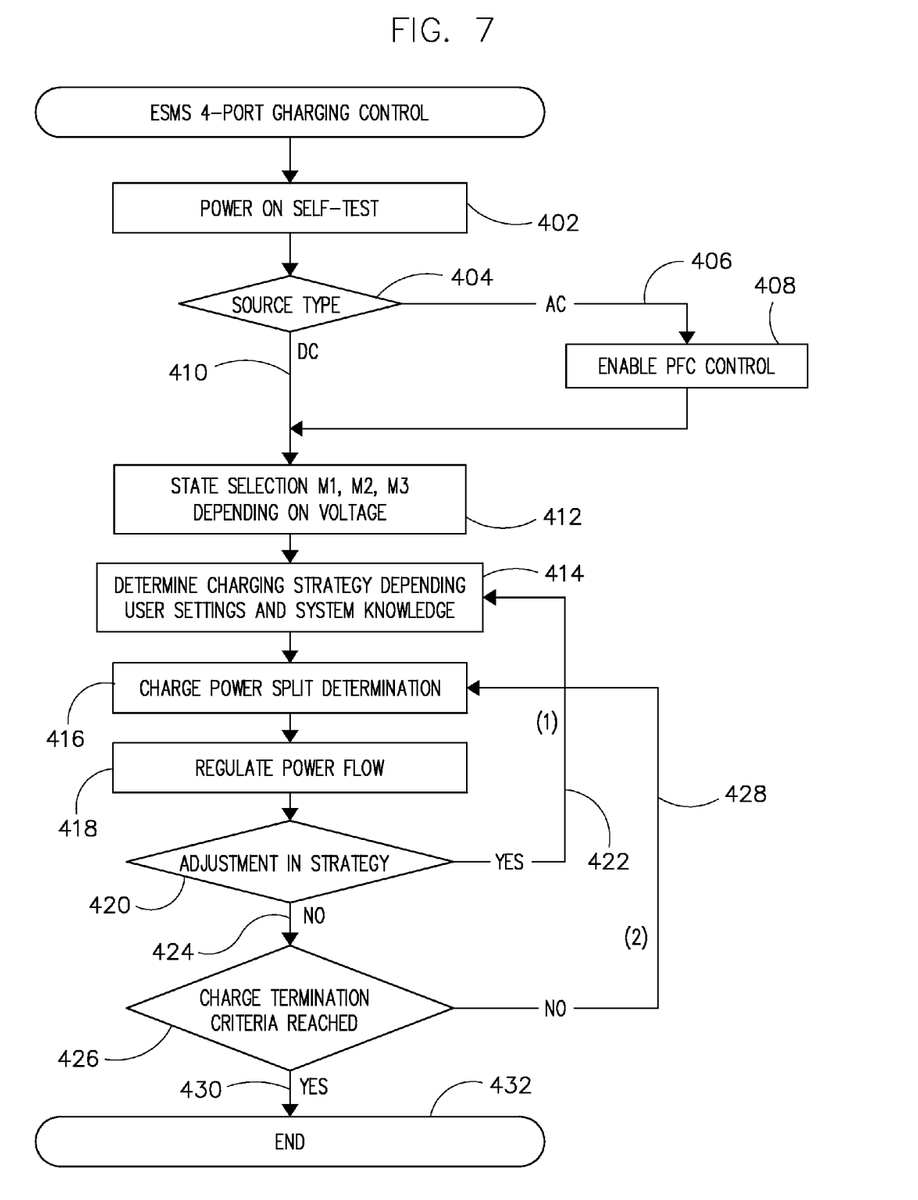
FIG. 7 illustrates a flow diagram for dual battery charging, according to an embodiment of the invention.

The overall control 400 of the dual battery integrated charger is shown in the flow diagram in FIG. 7. Power on self-test occurs at step 402, and source type—AC or DC—is determined at step 404. If AC 406, then PFC control is enabled at step 408. If DC 410, then state selection for modules M1 202, M2 204, and M3 206 are selected at step 412, depending on input voltage. The charging strategy is determined at step 414 that is based at least in part on conditions of energy storage devices coupled to the dual battery integrated charger (such as a voltage at a port, for instance), a power split determination is made at step 416, and power flow is regulated at step 418 based on the determination at step 416. Strategy adjustment may occur at step 420 that may be based on a condition of a battery or storage device. If strategy is to be adjusted 422, then control returns to step 414 for a subsequent assessment. If not 424, then a criteria for charge termination occurs at step 426. If the criteria has not been reached 428, then control returns to step 416 for a subsequent assessment of the power split. If the criteria has been met 430, then the process ends 432 and charging is complete. The inner control loop 422 is constantly monitoring parameter and adjusting the power split factor in real time. The charge termination criteria 426 determines when one or both energy storage units are declared as full SOC and termination of charging is performed.

Thus, the flexibility is an essential property of the multi-port integrated charger ESMS. For simplicity not all cases are described explicitly, rather a matrix form is chosen to capture many possible cases and arrangements for recharge.

Figure 8:
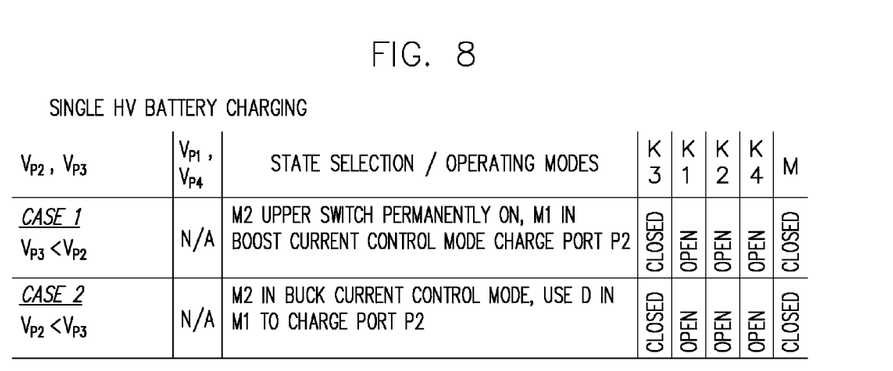
FIG. 8 is a table illustrating aspects of contactor settings, with comments for single high-voltage batter charging to port 2.

FIG. 8 is a table illustrating aspects of contactor settings, with comments for single high-voltage batter charging to port 2.

Figure 9:
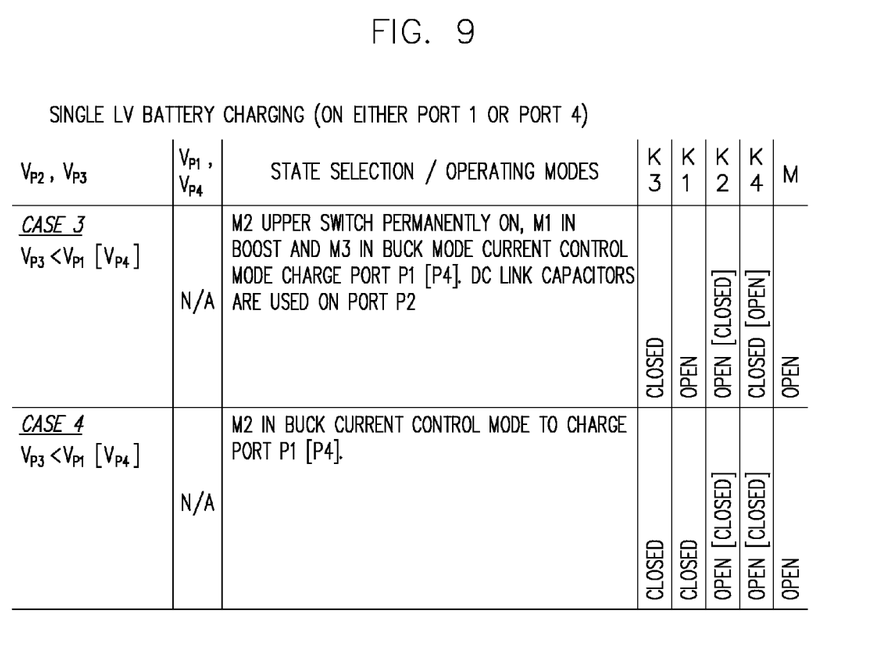
FIG. 9 is a table illustrating aspects of contactor settings, with comments for single low-voltage batter charging to ports 1 or 4.

FIG. 9 is a table illustrating aspects of contactor settings, with comments for single low-voltage batter charging to ports 1 or 4.

Figure 10A:
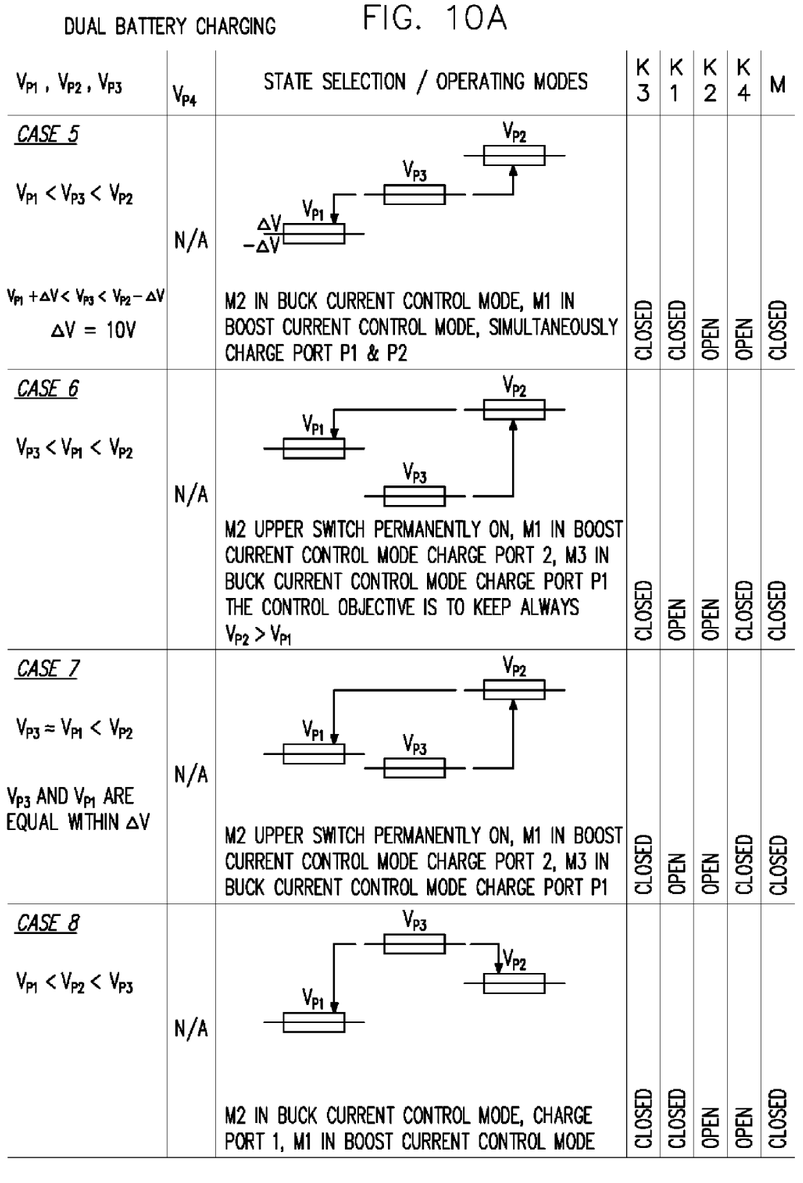
Figure 10B:
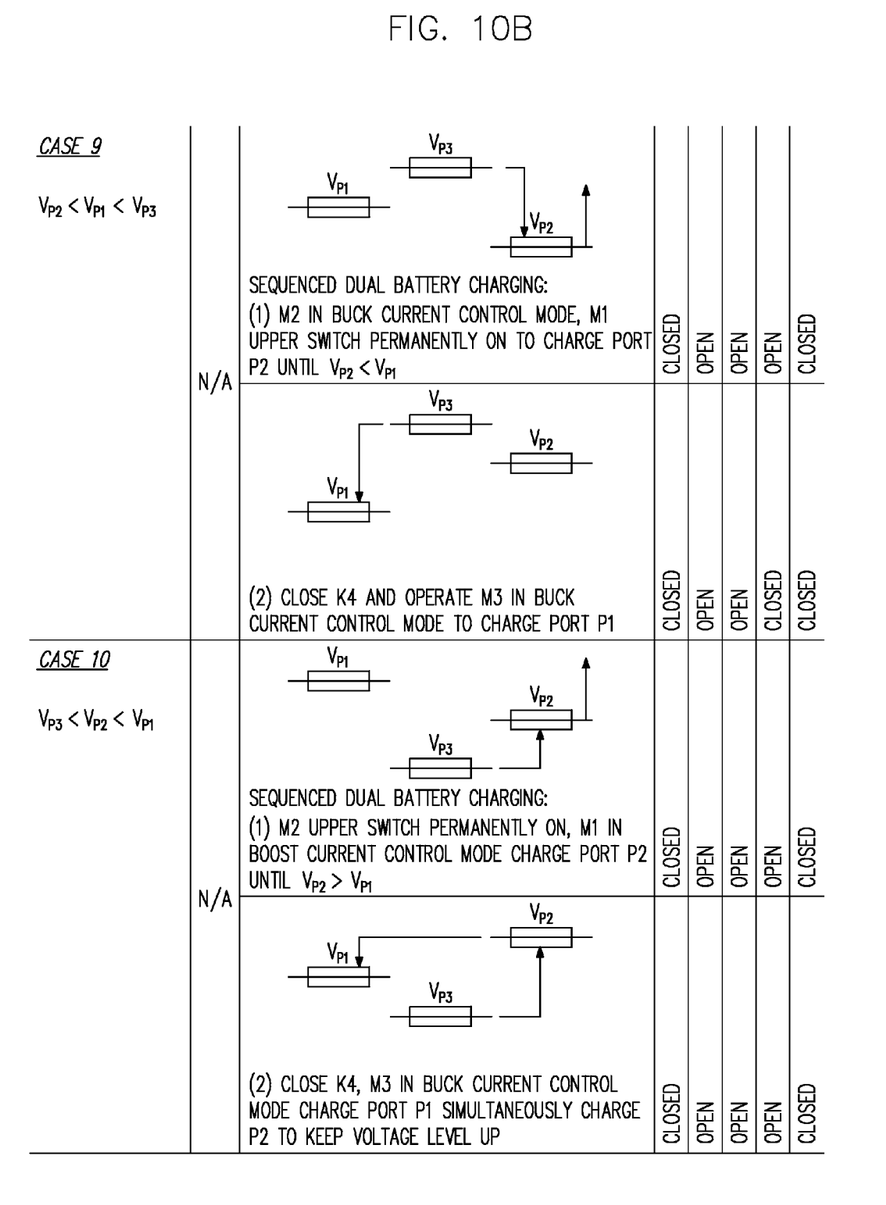
Figure 10C:
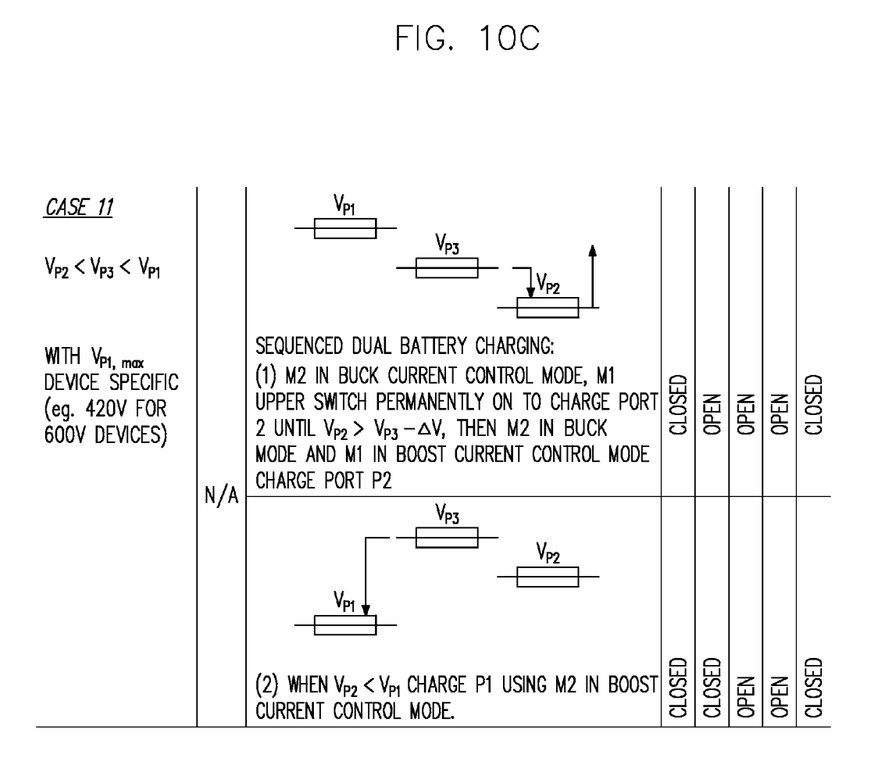

FIGS. 10 A-C are a table illustrating aspects of contactor settings, with comments for dual battery charging to ports 1 and 3.

As such, FIGS. 8-10 illustrate a variety of charging scenarios for single high-voltage battery charging, single low-voltage battery charging, and dual battery charging, according to embodiments of the invention. The illustrations include settings for switches K1 218, K2 220, K3 216, K4 222, and M 224, as they pertain to FIG. 4 as discussed above, and as they pertain to various cases for charging as described in cases 1-10. The cases 1-10 described include settings also as they pertain to various measured voltage at Ports P1-P4, respectively elements 208-214 of FIG. 4, as well.

A technical contribution for the disclosed apparatus is that it provides for a controller implemented technique for electric drive systems including hybrid and electric vehicles and, more particularly, to charging energy storage devices of an electric vehicle using a multiport energy management system.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the invention, an energy storage and management system (ESMS) includes one or more energy storage devices coupled to a power device and configured to store electrical energy, a power electronic conversion system having a plurality of energy ports, the power electronic conversion system comprising a plurality of DC electrical converters, each DC electrical converter configured to step up and to step down a DC voltage, wherein each of the plurality of energy ports is coupleable to each of the one or more energy storage devices, and each of the plurality of energy ports is coupleable to an electrical charging system. The ESMS includes a controller configured to determine a first condition of a first energy storage device and a second condition of a second energy storage device, wherein the first and second energy storage devices are each connected to respective energy ports of the power conversion system, determine a power split factor based on the first condition and on the second condition, and regulate power to the first and second energy storage devices based on the power split factor.

In accordance with another embodiment of the invention, a method of managing an energy storage and management system (ESMS) includes determining a first charge status of a first energy storage device, determining a second charge status of a second energy storage device, determining a power split factor based on the first charge status and the second charge status, and regulating charging power to the first and second energy storage devices consistent with the power split factor.

In accordance with yet another embodiment of the invention, a non-transitory computer readable storage medium positioned on an energy storage and management system (ESMS) and having stored thereon a computer program comprising instructions which when executed by a computer cause the computer to determine an electrical status of a first energy storage device and of a second energy storage device, wherein the first and second energy storage devices are each connected to respective energy ports of the ESMS, determine a power split factor based on the electrical status of the first and second energy storage devices, and regulate power to the first and second energy storage devices based on the power split factor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An energy storage and management system (ESMS) comprising:
   one or more energy storage devices positioned on-board a vehicle and coupled to a power device and configured to store electrical energy;
   a power electronic conversion system having a plurality of energy ports, the power electronic conversion system comprising a plurality of DC electrical converters, each DC electrical converter configured to step up and to step down a DC voltage, wherein:
      each of the plurality of energy ports is coupleable to each of the one or more energy storage devices; and
      each of the plurality of energy ports is coupleable to an electrical charging system located off-board the vehicle; and
   a controller configured to:
      detect connection of an electrical charging system located off-board the vehicle to one or more of the plurality of energy ports, with at least one of a voltage and frequency of the electrical charging system being determined;
      determine a first condition of a first energy storage device and a second condition of a second energy storage device, wherein the first and second energy storage devices are each connected to respective energy ports of the power conversion system;
      determine a power split factor based on the first condition and on the second condition; and
      selectively operate the plurality of DC electrical converters in the ESMS based on the power split factor and based on the at least one of the voltage and frequency of the electrical charging system, so as to regulate power to the first and second energy storage devices.

2. The system of claim 1 wherein the condition of the first energy storage device and the condition of the second energy storage device comprise one of a state-of-charge (SOC) and an amount of cell imbalance.

3. The system of claim 1 wherein the controller is configured to continuously monitor the first condition and the second condition, and revise the power split factor as a function of a changed first condition of the first energy storage device and of a changed second condition of the second energy storage device.

4. The system of claim 1 wherein, in determining the power split factor, the controller is configured to regulate power such that 100% of the power is directed to only one of the first and second energy storage devices.

5. The system of claim 1 wherein the controller is configured to determine the power split factor based on at least one of a capacity of the first and second energy storage devices and on a charging current limit of one of the first and second energy storage devices.

6. The system of claim 1 wherein the controller is configured to:
   determine a voltage of each energy port having either an energy storage device or a DC electrical charging system coupled thereto;
   determine the power split factor based on the determined voltage of each respective energy port; and
   electrically connect a first energy port to a second energy port of at least two of the plurality of energy ports such that at least one of the DC electrical converters either steps up or steps down an input DC voltage based on the regulation of power to the first and second energy storage devices.

7. The system of claim 1 wherein the power device comprises one of a vehicle drivetrain, an uninterrupted power supply, a mining vehicle drivetrain, a mining apparatus, a marine system, and an aviation system.

8. A method of managing an energy storage and management system (ESMS) comprising:
determining a first charge status of a first energy storage device;
determining a second charge status of a second energy storage device;
detecting connection of a charging power source located off-board of a system on which the first and second storage devices are included;
determining at least one of a voltage and frequency of a charging power received from the charging power source;
determining a power split factor based on the first charge status and the second charge status; and
regulating charging power to the first and second energy storage devices consistent with the power split factor and based on the at least one of the voltage and frequency of the charging power;
wherein regulating the charging power comprises selectively operating a plurality of switching devices and a plurality of buck-boost converters included in the ESMS to regulate the charging power to the first and second energy storage devices.

9. The method of claim 8 wherein determining the first charge status and the second charge status comprises determining one of a state-of-charge (SOC) and an amount of cell imbalance.

10. The method of claim 8 comprising:
monitoring the first charge status and the second charge status for change;
re-determining the power split factor based on the change; and
regulating the charging power to the first and second energy storage devices consistent with the re-determined power split factor.

11. The method of claim 8 wherein determining the power split factor comprises regulating the charging power such that 100% of the power is directed to only one of the first and second energy storage devices.

12. The method of claim 8 wherein determining the power split factor comprises determining the power split factor based on at least one of a capacity of the first and second energy storage devices and on a charging current limit of one of the first and second energy storage devices.

13. The method of claim 8 comprising:
electrically connecting the first energy storage device to a first energy port of the ESMS; and
electrically connecting the second energy storage device to a second energy port of the ESMS;
wherein determining the first charge status comprises determining a voltage of the first energy port; and
wherein determining the second charge status comprises determining a voltage of the second energy port.

14. The method of claim 13 comprising electrically connecting the first energy port to the second energy port via one or more DC electrical converters, such that at least one of the DC electrical converters either steps up or steps down an input DC voltage to a third energy port of the ESMS based on the regulation of power to the first and second energy storage devices.

15. The method of claim 8 wherein the first energy storage device and the second energy storage device are electrically connected to a power device.

16. The method of claim 15 wherein the power device comprises one of a vehicle drivetrain, an uninterrupted power supply, and an aviation system.

17. A non-transitory computer readable storage medium positioned on an energy storage and management system (ESMS) comprising a plurality of energy ports, a plurality of switching devices, and a plurality of buck-boost converters, the non-transitory computer readable storage medium having stored thereon a computer program comprising instructions which when executed by a computer cause the computer to:
determine an electrical status of a first energy storage device and of a second energy storage device, wherein the first and second energy storage devices are each connected to respective energy ports of the ESMS;
determine an electrical status of an electrical charging system connected to another energy port of the ESMS, the electrical charging system comprising one of an AC power grid, an AC charging station, or a high voltage DC charger;
determine a power split factor based on the electrical status of the first and second energy storage devices; and
regulate power to the first and second energy storage devices based on the power split factor and based on the electrical status of the electrical charging system;
wherein regulating the power to the first and second energy storage devices comprises selectively operating the plurality of switching devices and the plurality of buck-boost converters included in the ESMS to regulate the power to the first and second energy storage devices.

18. The computer readable storage medium of claim 17 wherein the computer is caused to determine the status of the first energy storage device and of the second energy storage device based on one of a state-of-charge (SOC) and an amount of cell imbalance of each of the first and second energy storage devices.

19. The computer readable storage medium of claim 17 wherein the computer continuously monitors the electrical status of the first and second energy storage devices for change, and the computer is further caused to revise the power split factor based on the change.

20. The computer readable storage medium of claim 17 wherein, in determining the power split factor, the computer is caused to cause 100% of the power to flow to only one of the first and second energy storage devices for a first time period.

21. The computer readable storage medium of claim 20 wherein the first time period is determined based on the charge status of the only one energy storage device to which power is regulated to flow.

22. The computer readable storage medium of claim 20 wherein, upon passage of the first time period, the computer is programmed to re-determine the power split factor and regulate power to flow to both the first and second energy storage devices.

23. The computer readable storage medium of claim 17 wherein the computer is configured to determine the power split factor based on at least one of a capacity of the first and second energy storage devices and on a charging current limit of one of the first and second energy storage devices.

24. The computer readable storage medium of claim 17 wherein the computer is caused to:
determine a voltage of each energy storage device;
determine the power split factor based on the determined voltage of each respective energy port; and electrically connect a first energy port to a second energy port of at least two of the plurality of energy ports such that at least one of the plurality of buck-boost converters either steps up or steps down an input DC voltage based on the regulation of power to the first and second energy storage devices.

* * * * *